(12) United States Patent
Langrel et al.

(10) Patent No.: US 7,913,992 B2
(45) Date of Patent: Mar. 29, 2011

(54) METHODS OF MOVING A MEDIA SHEET IN A SCANNING DEVICE

(75) Inventors: Charles Brandon Langrel, Lexington, KY (US); Chengwu Cui, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 478 days.

(21) Appl. No.: 11/959,527

(22) Filed: Dec. 19, 2007

(65) Prior Publication Data

US 2009/0160122 A1 Jun. 25, 2009

(51) Int. Cl.
*B65H 5/00* (2006.01)

(52) U.S. Cl. .............. 271/10.09; 271/121; 271/242

(58) Field of Classification Search .............. 271/4.08, 271/4.09, 4.1, 10.09, 10.1, 10.11, 121, 122, 271/270, 242; 358/1.12, 488, 496, 498; 399/395; 400/579

See application file for complete search history.

(56) References Cited

U.S. PATENT DOCUMENTS

| 5,370,381 | A | | 12/1994 | Winship et al. | |
|---|---|---|---|---|---|
| 5,678,488 | A | * | 10/1997 | Yamaguchi et al. | 101/483 |
| 5,927,706 | A | * | 7/1999 | Hiroi et al. | 271/117 |
| 5,967,506 | A | * | 10/1999 | Miki et al. | 271/10.13 |
| 5,996,989 | A | | 12/1999 | Cahill et al. | |
| 7,006,785 | B2 | * | 2/2006 | Embry | 399/388 |
| 2005/0214048 | A1 | * | 9/2005 | Embry | 399/388 |

* cited by examiner

*Primary Examiner* — Stefanos Karmis
*Assistant Examiner* — Michael C McCullough

(57) ABSTRACT

The present application is directed to embodiments for moving a media sheet within a scanning device. The methods include moving the media sheet through a separation mechanism that prevents multiple media sheets from being moved simultaneously along the media path. Further, a buckle is formed in the sheet at a point upstream from a scanner. The buckle acts as a buffer to absorb any load release that could occur as the media sheet exits the separation mechanism. The load release could cause a change in the velocity of the media sheet as it moves across the scanner.

19 Claims, 7 Drawing Sheets

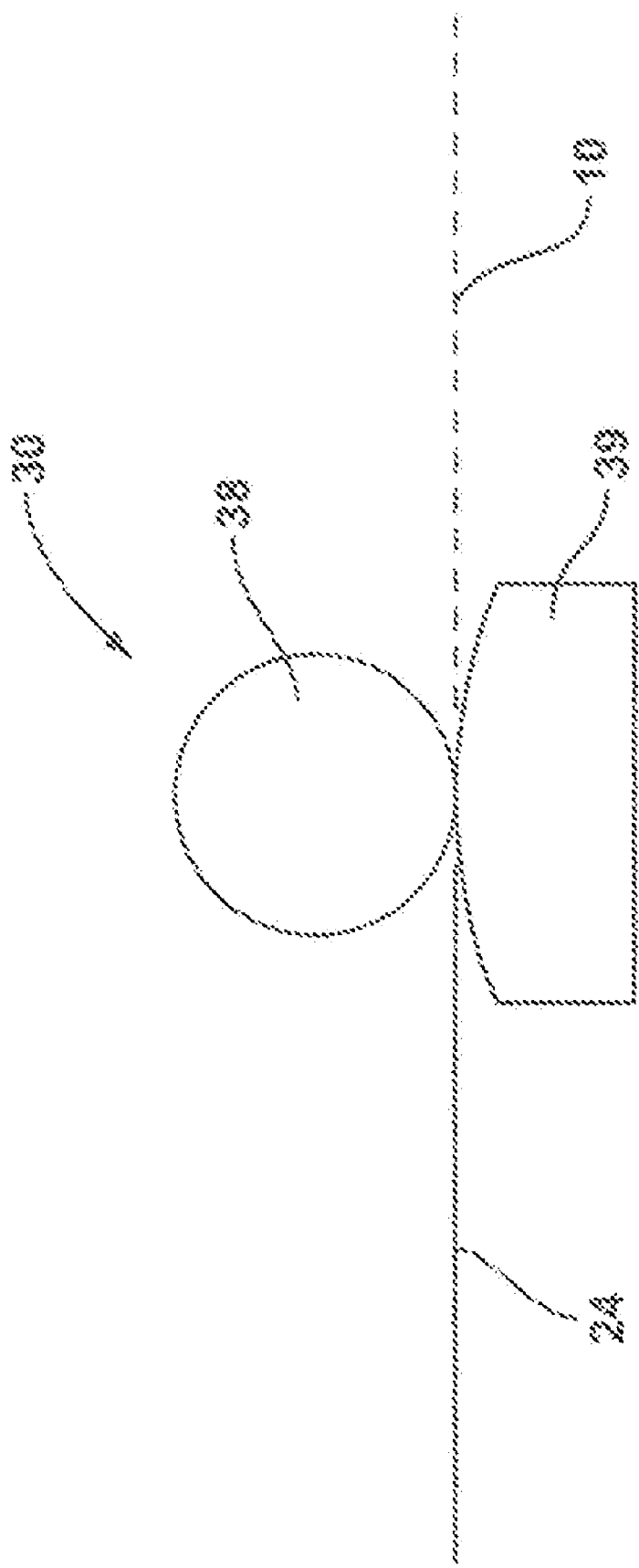

METHODS OF MOVING A MEDIA SHEET IN A SCANNING DEVICE

BACKGROUND

The present application is directed to methods of moving a media sheet and more specifically to moving a media sheet at a constant speed across a scanner in a scanning device.

Many scanning devices utilize an automatic document feeder to feed media sheets across a stationary scan head. The automatic document feeder provides a quick and easy solution for scanning documents. One challenge is maintaining a constant velocity of the media sheet as it is scanned. Sudden variations in the speed may cause an image quality defect such as a line compression or expansion.

Most automatic document feeders incorporate a pick and separation mechanism designed to pick only one media sheet at a time. In one embodiment, a top sheet in a media stack is picked and fed into the media path, and the separation mechanism prevents feeding additional media sheets. The separation mechanism may be stopped as the top sheet continues to be fed along the media path. A force created between belts and/or rollers in contact with the media sheet places a load on the media sheet as it moves along the stopped mechanism. This load is released when the trailing end of the media sheet moves beyond the separation mechanism. The release causes an increase in a rotation speed of feed rollers that are moving the media sheet along the media path. This increase in speed causes a sudden velocity increase in the media sheet as it moves along a length of the media sheet. If the media sheet is being scanned during the load release, the velocity increase causes an image quality defect.

The media path should be constructed to ensure accurate scanning of the media sheet occurs as it moves along the media path. Further, the media path should be constructed to prevent media jams that may occur during the pick and feeding process. The media jams require that the scanning device be deactivated, the media path accessed, and the jammed media sheet removed. This process is frustrating for users, greatly slows throughput of the device, and may result in damage to the media sheet and/or scanner.

SUMMARY

The present application is directed to embodiments for moving a media sheet within a scanning device. The methods include moving the media sheet through a separation mechanism that prevents multiple media sheets from being moved simultaneously along the media path. Further, a buckle is formed in the sheet at a point upstream from a scanner. The buckle acts as a buffer to absorb any load release that could occur as the media sheet exits the separation mechanism. The load release could cause a change in the velocity of the media sheet as it moves across the scanner.

BRIEF DESCRIPTION OF THE DRAWINGS

FIG. 3 is a side view of a separation mechanism according to one embodiment.

DETAILED DESCRIPTION

The present application is directed to embodiments for moving a media sheet within a scanning device. The methods include moving the media sheet through a separation mechanism that prevents multiple media sheets from being moved simultaneously along the media path. Further, a buckle is formed in the sheet at a point upstream from a scanner. The buckle acts as a buffer to absorb any load release that could occur as the media sheet exits the separation mechanism. The load release could cause a change in the rotational speed of feed rollers that are moving the media sheet and the velocity of the media sheet as it moves across the scanner.

Figure 1:
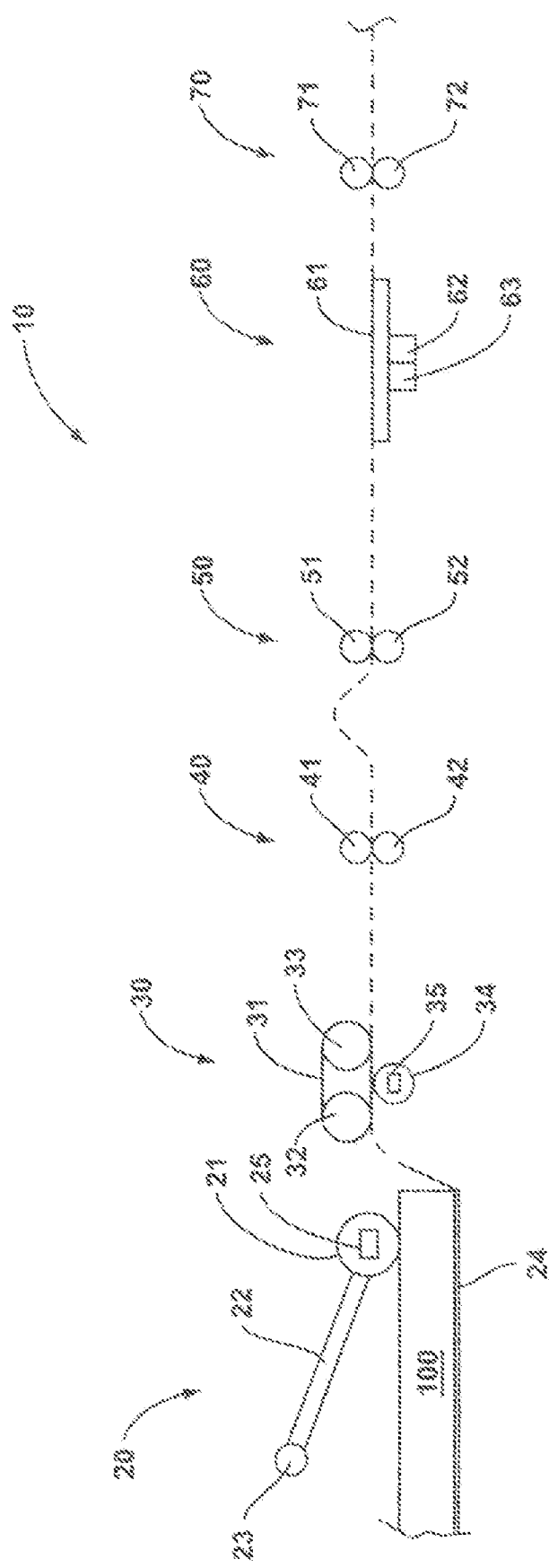
FIG. 1 is a schematic view of a section of a media path according to one embodiment.

FIG. 1 includes a schematic diagram of a section of the media path 10. This section includes a pick mechanism 20, separation mechanism 30, first and second feed nips 40, 50, a scanner 60, and an exit nip 70.

The pick mechanism 20 includes a pick roll 21 mounted on an arm 22. The arm 22 is movable about a pivot 23 such that the roll 21 remains in contact with a media sheet 100 positioned on a support surface 24. In one embodiment, the pick roll 21 includes a clutch 25 such that it may rotate after the pick mechanism 20 is deactivated and the pick roll 21 remains in contact with the media sheet 100. One embodiment of a pick mechanism 20 is disclosed in U.S. patent application Ser. No. 10/436,406, herein incorporated by reference.

The media sheet 100 is positioned on the support surface 24 adjacent to the pick mechanism 20. In the embodiment of FIG. 1, the support surface 24 is part of an input tray capable of holding a stack of media sheets 100. In another embodiment, the support surface 24 is part of a feed area where the media sheet is manually placed by a user for insertion into the media path 10.

The separation mechanism 30 is positioned in proximity to the pick mechanism 20. Separation mechanism 30 prevents multiple media sheets 100 from being moved along the media path 10. Separation mechanism 30 includes a nip formed between a separation roller 34 and a feed belt 31 that extends around rollers 32, 33.

In one embodiment, the belt 31 includes a first coefficient of friction with the media sheet 100 and the separation roller 34 includes a second coefficient of friction with the media sheet 100. The second coefficient is less than the first, but greater than a coefficient between two media sheets 100. In the event multiple media sheets 100 are introduced into the separation mechanism 30, the different coefficients cause the belt 31 to move the top-most media sheet 100 along the media path 10, and prevent forward movement of the other, lower media sheets 100 that do not contact the belt 31. In one embodiment, the separation roller 34 includes a clutch and torque limiting mechanism 35. The separation roller 34 is driven in a reverse direction to prevent any lower media sheets 100 from moving along the media path 10 with the top-most sheet that is in contact with the belt 31. The clutch and mechanism 35 releases the roller 34 and allows it to rotate in a forward direction when there are not multiple media sheets in the separation mechanism 30.

The first feed nip 40 is formed by roller 41 and roller 42. The rollers 41, 42 rotate to move the media sheet 100 in a forward direction along the media path 10. Likewise, the second feed nip 50 is formed by roller 51 and roller 52 that continue moving the media sheets 100 in the forward direction along the media path 10.

The scanner 60 includes a light source 63 and a scan head 62 positioned under a platen 61. The platen 61 includes a clear member such as glass or plastic that supports the media sheet 100 for illumination by the light source 63, e.g., xenon fluorescent lamp or CCFL source, and scanning by the scan head 62. The scan head 62 captures an image of the media sheet 100 by optically scanning successive, discrete lines as the media sheet 100 moves over the platen 61. In one embodiment, the scan head 62 includes a single CCD array for capturing monochrome images, while another embodiment includes multiple arrays with red, green, and blue filters for capturing color images. Generally, the scan head 62 may include one or more mirrors, lenses, filters, and CCD arrays, as needed to support the intended scanning functions.

An exit nip 70 is positioned downstream from the scanner 60. Exit nip 70 is formed by rollers 71, 72 that rotate to move the media sheet 100 forward and further along additional sections of the media path 10.

In previous scanning devices, a single feed nip was positioned downstream from the separation mechanism 30. The separation mechanism 30 was stopped while the media sheet was still in contact with the separation mechanism and also moving across the scanner 60. The stopped separation mechanism 30 placed a load on the media sheet that was released when the trailing edge of the media sheet moved beyond the separation mechanism 30. The release of the load caused an increase in speed of the rollers of the feed nip that resulted in an increase in velocity of the media sheet 100. The increase in velocity caused an image quality defect in the scanned image, such as a compressed scan line.

The present embodiments prevent the load release from causing an image quality defect in the scanned image. FIGS. 2A-2E illustrate one embodiment of moving the media sheet 100 along the section of the media path 10 and preventing the image quality defect.

The embodiment begins with the pick mechanism 20 being activated and rotating the pick roll 21 to begin moving the media sheet 100 from the support surface 24. The media sheet 100 is moved along the media path 10 and into the separation mechanism 30. The separation mechanism 30 allows only media sheet 100 to continue along the media path 10 in the event the pick mechanism 20 moves multiple media sheets from the support surface 24.

Figure 2A:
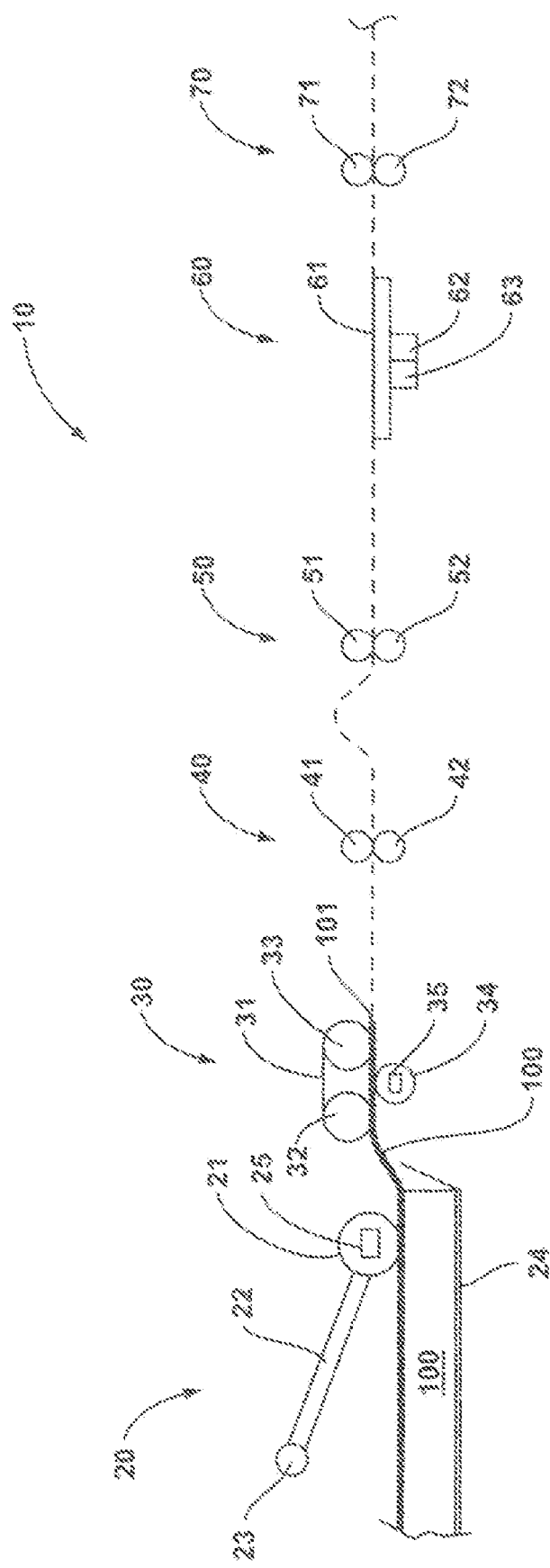
FIGS. 2A-2E are schematic views of a media sheet moving along a media path according to one embodiment.
Figure 2B:
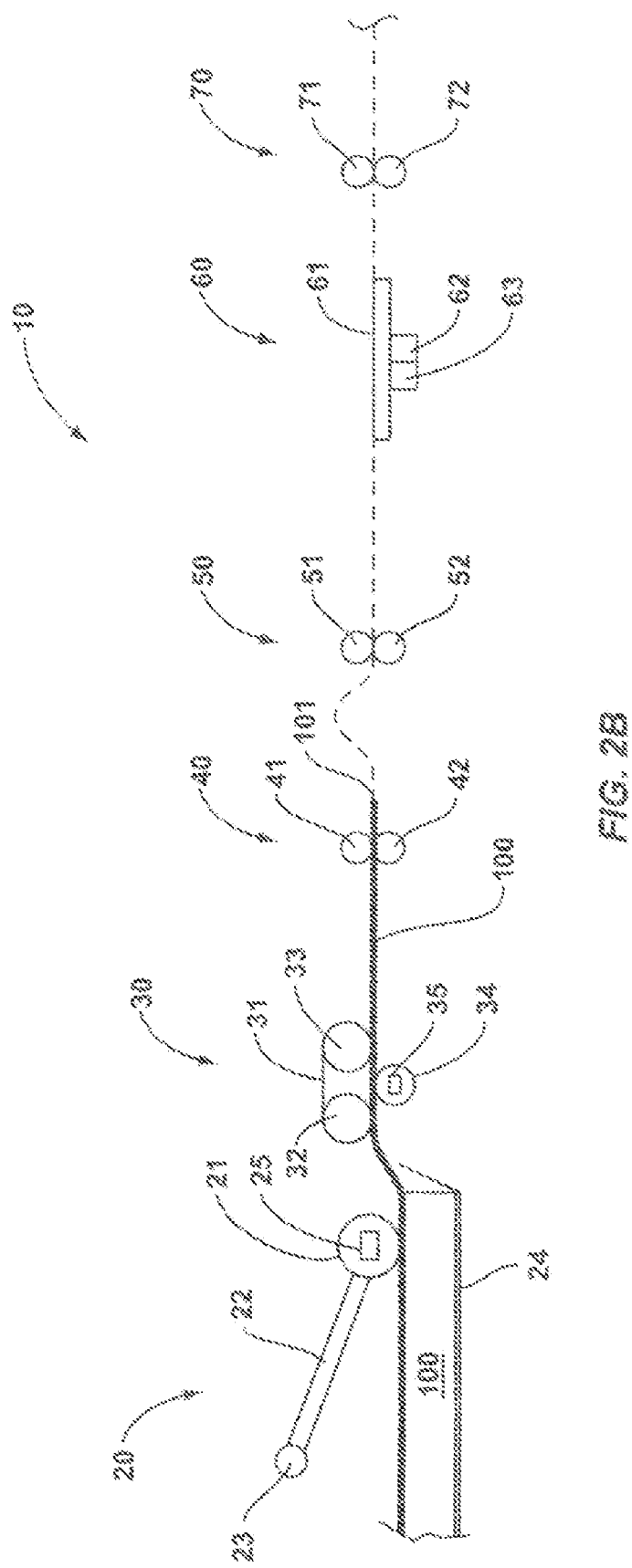

As illustrated in FIG. 2B, the media sheet 100 is driven further along the media path 10 and into the first feed nip 40. In one embodiment, the first feed nip 40 moves the media sheet 100 at a faster speed than the separation mechanism 30.

Figure 2C:
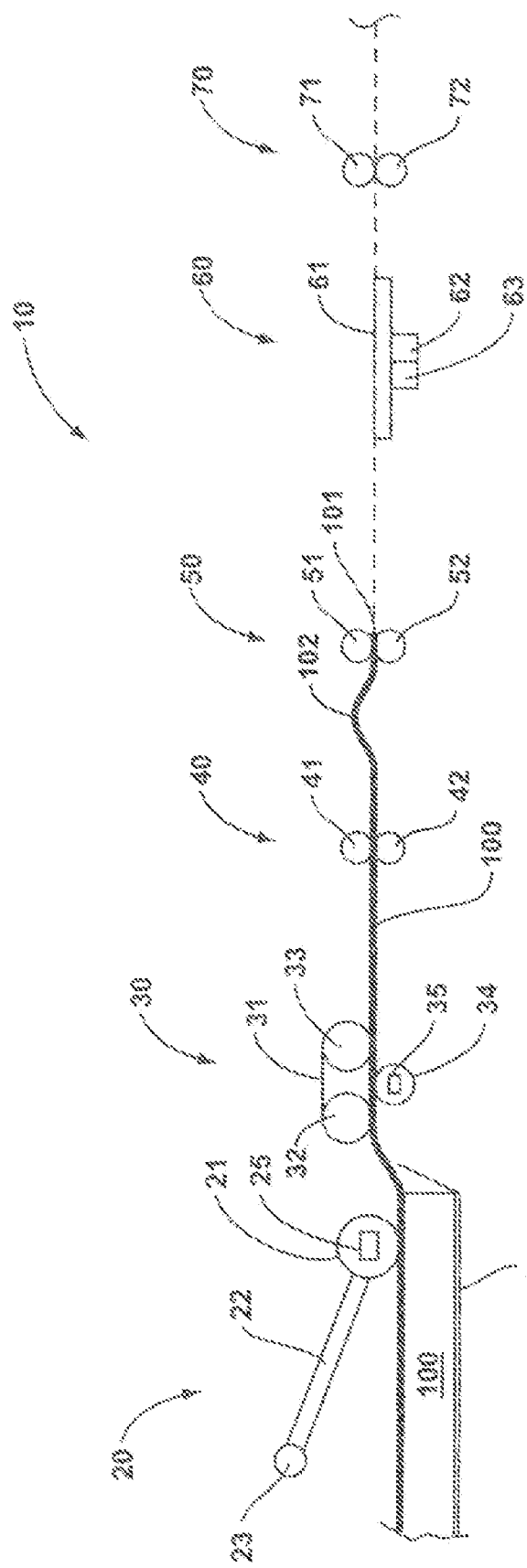
Figure 2D:
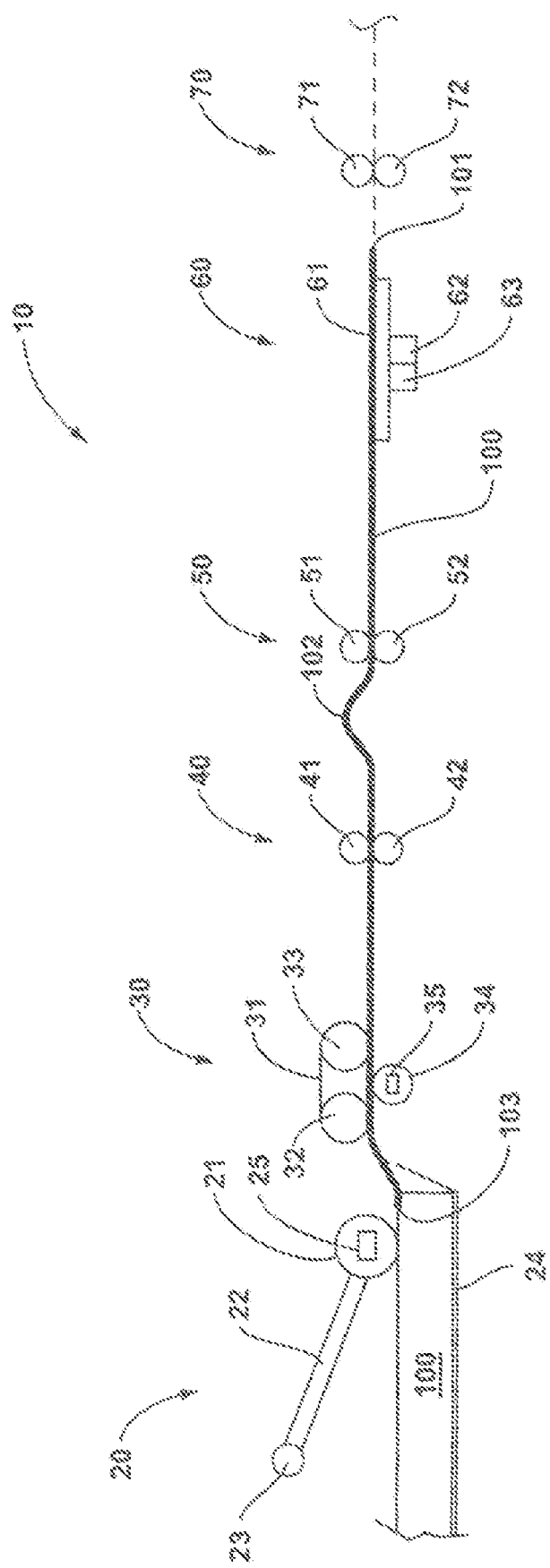
Figure 2E:
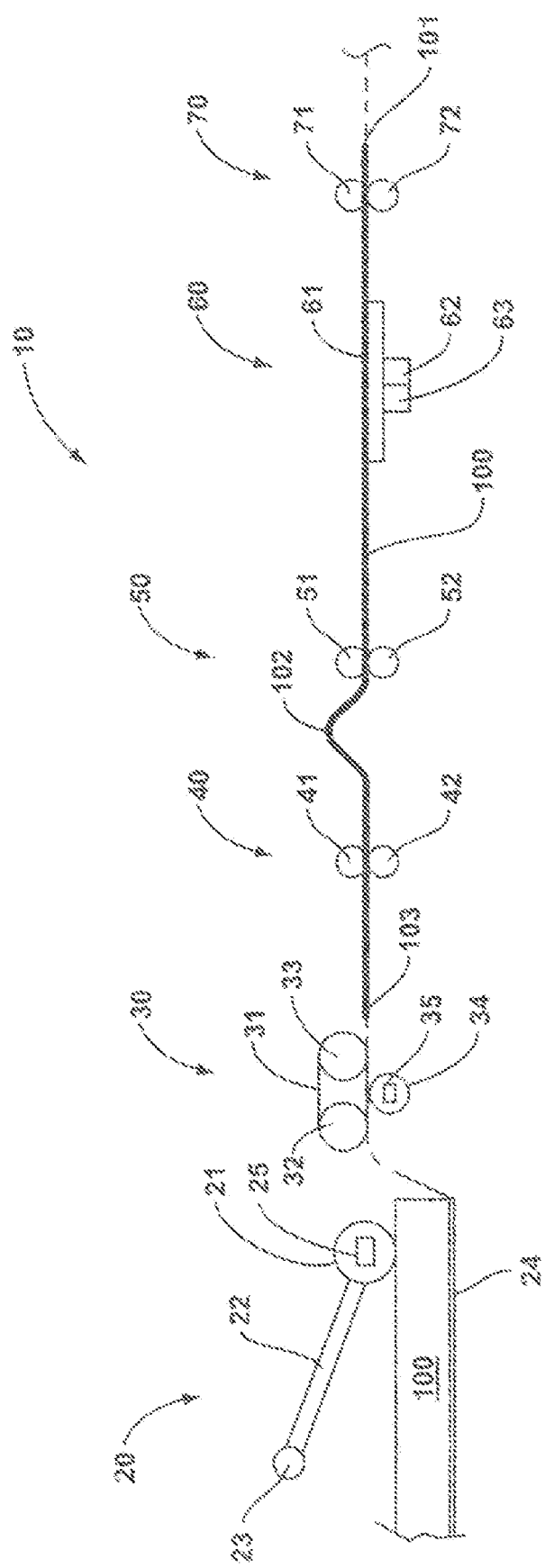

The media sheet 100 continues to move along the media path 10 and into the second feed nip 50 as illustrated in FIG. 2C. In one embodiment, the second feed nip 50 moves the media sheet 100 at a slower speed than the first feed nip 40. This discrepancy in speeds causes a buckle 102 to form upstream from the second feed nip 50. As illustrated in the progression of FIGS. 2C-2E, the buckle 102 may slowly grow as the first feed nip 40 drives the media sheet 100 at the faster speed. In another embodiment, the second feed nip 50 is stationary or rotating in a reverse direction when the leading edge 101 reaches the second feed nip 50 to form the buckle 102. The buckle 102 is formed, and then the second feed nip 50 is rotated in a forward direction to continue moving the media sheet 100 along the media path 10. In this embodiment, the first and second feed nips 40, 50 may drive the media sheet 100 at the same speed. In the various embodiments, the buckle 102 is formed while the media sheet 100 is still within the separation mechanism 30.

At some point, the separation mechanism 30 is deactivated while the media sheet 100 is still in contact with the separation mechanism 30. This is necessary to prevent multiple media sheets from being fed in an overlapping fashion along the media path 10. In one embodiment, the separation mechanism 30 is deactivated when the leading edge 101 passes beyond the second feed nip 50.

As illustrated in FIG. 2D, the media sheet 100 continues to move along the media path 10 and across the scanner 60. The length of the media sheet 100 is such that it moves across the scanner 60 while still being in contact with the separation mechanism 30.

As illustrated in FIG. 2E, a trailing edge 103 of the media sheet 100 eventually moves beyond the separation mechanism 30 while the media sheet 100 is moving across and being scanned at the scanner 60. The load on the media sheet 100 is released once the trailing edge 103 passes the separation mechanism 30. The release may result in an increase in the rotational speed of the first feed nip rollers 41, 42, and thus cause an increase in the buckle 102. However, the increase is isolated to the section of the media sheet upstream from the second feed nip 50. The buckle 102 prevents the increase from transferring further downstream to the section of the media sheet 100 moving across the scanner 60.

The media sheet 100 is continues to move along the media path and across the scanner 60. Eventually, the media sheet 100 exits this section of the media path 10 beyond the exit nip 70.

Various types of separation mechanisms 30 may be used to prevent multiple media sheets 100 from being moved along the media path. FIG. 3 illustrates an embodiment with a feed roller 38 that contacts against a pad 39. The feed roller 38 includes a relatively high coefficient of friction with the media sheet 100, and the pad 39 includes a lower coefficient of friction with the media sheet 100. The pad coefficient with the media sheet 100 is higher than a coefficient between two media sheets 100. Other embodiments (not illustrated) may include two rollers that form a nip.

In one embodiment, the media sheets 100 are aligned on the support surface 24 in a manner such that the separation mechanism 30 is able to pick the media sheet 100 and move them along the media path 100. One embodiment includes the support surface 24 positioned at an angle such that the leading edges of the media sheets 100 abut against the separation mechanism 30. In these embodiments, there is no pick mechanism 20.

The media path 10 may be used in various types of scanning devices, including but not limited to a printer, copier, facsimile, and combination all-in-one devices.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of moving a media sheet in a scanning device comprising:

placing a load on the media sheet as the media sheet moves along a first point on a media path;
forming a buckle in the media sheet at a second point along the media path downstream from the first point;
moving the media sheet at a predetermined speed across a scanner at a third point along the media path downstream from the second point; and
moving the media sheet past the first point and releasing the load while the media sheet is still moving across the scanner; and
absorbing a velocity change in the media sheet at the buckle and continue moving the media sheet at the predetermined speed across the scanner,
wherein placing a load comprises stopping a separation mechanism located at the first point while the media sheet is moving across the scanner.

2. The method of claim 1, further comprising forming the buckle between a first feed nip and a second feed nip that are positioned along the media path between the first point and the scanner.

3. The method of claim 2, further comprising forming the buckle by moving the media sheet at a faster speed at the first feed nip than at the second feed nip.

4. The method of claim 1, wherein the step of placing the load on the media sheet as the media sheet moves along the first point on the media path comprises moving the sheet through the separation mechanism that includes a first member that contacts a first surface of the media sheet and a second member that contacts a second surface of the media sheet, the first and second members including different coefficient of frictions with the media sheet.

5. The method of claim 4, further comprising contacting a member against the first surface of the media sheet and a separation roller of the second member against the second surface.

6. The method of claim 1, further comprising moving the media sheet from a support surface with a pick mechanism while the media sheet is moving across the scanner.

7. A method of moving a media sheet in a scanning device comprising:
    picking the media sheet from a support surface;
    moving the media sheet through an activated separation mechanism located downstream from the support surface;
    moving the media sheet through first and second feed nips each positioned downstream from the separation mechanism;
    stopping the separation mechanism while the media sheet is still moving through the separation mechanism;
    forming a buckle in the media sheet between the first and second feed nips;
    moving the media sheet at a predetermined speed across a scanner positioned downstream from the second feed nip while the media sheet is moving through the separation mechanism that had been stopped; and
    continuing to move the media sheet across the scanner at the predetermined speed when a trailing edge of the media sheet moves beyond the stopped separation mechanism.

8. The method of claim 7, further comprising driving the second feed nip at a faster speed than the separation mechanism and the first feed nip.

9. The method of claim 7, further comprising moving the media sheet through an exit feed nip positioned downstream from the scanner while the media sheet moves across the scanner.

10. The method of claim 7, wherein the step of forming the buckle in the media sheet between the first and second feed nips comprises rotating the second feed nip in a reverse direction when a leading edge of the media sheet makes contact.

11. The method of claim 7, further comprising scanning successive and discrete lines of the media sheet as the media sheet is moving across the scanner.

12. The method of claim 7, wherein the step of picking the media sheet from the support surface comprises rotating a pick roller in contact with the media sheet and moving the media sheet away from the support surface.

13. The method of claim 7, wherein the step of moving the media sheet through the activated separation mechanism located downstream from the support surface comprises contacting a first side of the media sheet with a first member with a first coefficient of friction with the media sheet and contacting a second side of the media sheet with a second member with a second, different coefficient of friction with the media sheet.

14. The method of claim 7 wherein at least one of moving the media sheet and continuing to move the media sheet comprises moving the media sheet along the media path directly from the second feed nip and across the scanner.

15. A method of moving a media sheet in a scanning device comprising:
    moving the media sheet through an activated separation mechanism;
    moving the media sheet from the separation mechanism and directly into a first feed nip;
    moving the media sheet from the first feed nip directly into a second feed nip;
    forming a buckle in the media sheet between the first and second feed nips;
    stopping the separation mechanism while the media sheet is moving through the separation mechanism;
    moving the media sheet at a predetermined speed across a scanner positioned downstream from the second feed nip while the media sheet is moving through the stopped separation mechanism;
    scanning discrete and successive lines of the media sheet as the media sheet moves across the scanner; and
    continuing to move the media sheet across the scanner at the predetermined speed as a trailing edge of the media sheet moves beyond the stopped separation mechanism.

16. The method of claim 15, further comprising stopping the separation mechanism after a leading edge of the media sheet passes beyond the second feed nip.

17. The method of claim 15, further comprising stopping the separation mechanism before a leading edge of the media sheet moves across the scanner.

18. The method of claim 15, wherein the step of moving the media sheet through the activated separation mechanism located downstream from the support surface comprises contacting a first side of the media sheet with a first member with a first coefficient of friction with the media sheet and contacting a second side of the media sheet with a second member with a second, different coefficient of friction with the media sheet.

19. The method of claim 15, wherein the step of moving the media sheet through the activated separation mechanism comprises driving a first member of the separation mechanism that contacts a first side of the media sheet.

* * * * *